(12) United States Patent
Etesse

(10) Patent No.: US 10,532,847 B2
(45) Date of Patent: Jan. 14, 2020

(54) PACKAGE HAVING A PLUG SEAL CLOSURE

(71) Applicant: The Procter & Gamble Company, Cincinnati, OH (US)

(72) Inventor: Patrick Jean-Francois Etesse, Brussels (BE)

(73) Assignee: The Procter & Gamble Company, Cincinnati, OH (US)

( * ) Notice: Subject to any disclaimer, the term of this patent is extended or adjusted under 35 U.S.C. 154(b) by 387 days.

(21) Appl. No.: 14/505,950

(22) Filed: Oct. 3, 2014

(65) Prior Publication Data

US 2015/0096957 A1   Apr. 9, 2015

Related U.S. Application Data

(60) Provisional application No. 61/886,863, filed on Oct. 4, 2013.

(51) Int. Cl.
*B65D 1/02* (2006.01)
*B65D 35/08* (2006.01)
(Continued)

(52) U.S. Cl.
CPC ............ *B65D 1/02* (2013.01); *B29C 49/0047* (2013.01); *B29C 49/02* (2013.01); *B29C 49/22* (2013.01);
(Continued)

(58) Field of Classification Search
CPC .......... B65D 1/02; B65D 39/00; B65D 35/08; B29D 22/003; B29C 49/02;
(Continued)

(56) References Cited

U.S. PATENT DOCUMENTS 2,194,147 A † 3/1940 Mauser
3,307,738 A * 3/1967 Scheindel ............... B29C 53/36
220/678

(Continued)

FOREIGN PATENT DOCUMENTS

EP   2 321 113 B1   1/2013
FR   2 851 227 A1   8/2004
(Continued)

OTHER PUBLICATIONS

International Search Report for International Application No. PCT/US2014/058930, dated Jan. 26, 2015, 12 pages.
(Continued)

*Primary Examiner* — Anthony D Stashick
*Assistant Examiner* — James M Van Buskirk
(74) *Attorney, Agent, or Firm* — Gary J. Foose

(57) ABSTRACT

A package including: a container; and a plug seal closure operatively engaged with an open end of the container; wherein the container has; a closed end opposing the open end; a container wall extending longitudinally between the closed end and the open end about a longitudinal axis; an end seam extending at least partially across the closed end; and a longitudinal overlapping seam extending from the end seam, a portion of the overlapping seam extending longitudinally along the container wall between the closed end and the open end; wherein the open end is narrower than at least a portion of the container away from the open end of the container; and wherein the closed end and the container wall consist of a one-piece thermoplastic substrate.

17 Claims, 19 Drawing Sheets

(51) Int. Cl.
*B29C 49/22* (2006.01)
*B29C 49/00* (2006.01)
*B29C 49/02* (2006.01)
*B29D 22/00* (2006.01)
*B65D 39/00* (2006.01)
*B29K 23/00* (2006.01)
*B29C 65/02* (2006.01)
*B29K 25/00* (2006.01)
*B29K 77/00* (2006.01)
*B29C 65/00* (2006.01)
*B29K 67/00* (2006.01)
*B29C 49/58* (2006.01)
*B29C 51/26* (2006.01)
*B29C 65/08* (2006.01)
*B29K 27/06* (2006.01)

(52) U.S. Cl.
CPC ......... *B29D 22/003* (2013.01); *B65D 35/08* (2013.01); *B65D 39/00* (2013.01); *B29B 2911/14593* (2013.01); *B29C 51/264* (2013.01); *B29C 65/02* (2013.01); *B29C 65/08* (2013.01); *B29C 66/1122* (2013.01); *B29C 66/4322* (2013.01); *B29C 66/49* (2013.01); *B29C 66/73921* (2013.01); *B29C 66/851* (2013.01); *B29C 2049/0052* (2013.01); *B29C 2049/0063* (2013.01); *B29C 2049/581* (2013.01); *B29K 2023/06* (2013.01); *B29K 2023/083* (2013.01); *B29K 2023/10* (2013.01); *B29K 2025/06* (2013.01); *B29K 2027/06* (2013.01); *B29K 2067/003* (2013.01); *B29K 2077/00* (2013.01)

(58) Field of Classification Search
CPC . B29C 66/1122; B29C 66/4322; B29C 66/49; B29C 66/73921; B29C 66/851; B29C 65/02; B29C 49/0047; B29C 49/22; B29C 65/08; B29C 51/264; B29C 2049/0052; B29C 2049/0063; B29C 2049/581; B29K 2023/10; B29K 2023/06; B29K 2203/083; B29K 2056/06; B29K 2027/06; B29K 2067/003; B29K 2077/00; B29B 2911/14593
USPC ................................................ 215/355, 382
See application file for complete search history.

(56) References Cited

U.S. PATENT DOCUMENTS

| | | | |
|---|---|---|---|
| 3,422,174 A | | 1/1969 | Hagen |
| 3,700,513 A | * | 10/1972 | Haberhauer ........ B29C 65/3656 156/198 |
| 4,116,607 A | † | 9/1978 | LeGrand |
| 4,624,821 A | † | 11/1986 | Younkin |
| 4,948,001 A | † | 8/1990 | Magly |
| 5,599,495 A | * | 2/1997 | Krall ...................... B29C 49/76 264/139 |
| 5,628,417 A | * | 5/1997 | Van Halteren ....... B65D 1/0246 215/331 |
| 5,730,694 A | † | 3/1998 | Hagleitner |
| 5,813,197 A | | 9/1998 | Aguzzoli |
| 2002/0066740 A1 | † | 6/2002 | Hermodsson |
| 2005/0051574 A1 | * | 3/2005 | Kesselman ............ B65D 35/08 222/107 |
| 2005/0139569 A1 | † | 6/2005 | Larsen |
| 2007/0090121 A1 | † | 4/2007 | Harp |
| 2011/0303673 A1 | † | 12/2011 | Wilkes |
| 2011/0315592 A1 | † | 12/2011 | Pennington |
| 2012/0031870 A1 | | 2/2012 | Porter et al. |
| 2014/0069943 A1 | * | 3/2014 | Kunz .................. B29D 22/003 220/694 |
| 2014/0072245 A1 | | 3/2014 | Dede et al. |
| 2015/0096957 A1 | † | 4/2015 | Etesse |

FOREIGN PATENT DOCUMENTS

| | | | |
|---|---|---|---|
| FR | 2851227 A1 | † | 8/2004 |
| WO | WO 94/19240 A1 | | 9/1994 |
| WO | 2008062224 A1 | † | 5/2008 |
| WO | 2009144559 A2 | † | 12/2009 |
| WO | 2010007004 A1 | † | 1/2010 |
| WO | WO 2010/007004 A1 | | 1/2010 |
| WO | WO 2012/152433 A1 | | 11/2012 |

OTHER PUBLICATIONS

U.S. Appl. No. 14/603,812, filed Jan. 23, 2015, Etesse.
Jim Ammon, Injection Molding: Mold Construction and Part Design, 20 pages, Sep. 4, 2008, http://idsa.sjsu.edu/Archive%20documents/injection%20molding%20lecture%2009-04-08.pdf.†
Gordon Bockner, The Agami Sheet-Fed Bottle, 2 pages, Jun. 15, 2011, Packaging Strategies News, http://digital.bnpmedia.com/article/The+Agami+Sheet-Fed+Bottle/755819/72683/article.html.†
Ratchaneekorn Mekchai, "ROLL N BLOW Thermoforming Machine," 4 pages, Apr. 18, 2011, Business France Thailand, http://www.youbuyfrance.com/th/Posts-2595-roll-n-blow-thermoforming-machine.†

\* cited by examiner
† cited by third party

US 10,532,847 B2

PACKAGE HAVING A PLUG SEAL CLOSURE

FIELD OF THE INVENTION

Package having a plug seal closure.

BACKGROUND OF THE INVENTION

Blown plastic containers can be thermoformed using processes known in the art, including extrusion blow molding, injection blow molding, injection stretch and blow molding. The plastic container can be part of a finished package that includes a closure for the plastic container.

The above processes can be practiced in a technically sufficient and economic manner for containers that are formed from a single layer of material, as evidenced by their wide commercial application globally for packaging water, soda, beer, juice, and the like. Containers formed by the above processes can be formed from polyethylene, polypropylene, polycarbonate, and other materials. Such processes become more complicated if containers having multiple layers are desired.

Multi-layered containers can be desired for several reasons. For example, there may be a desire to include one or more barrier or coating layers to provide for chemical stability of the contents of the container. For example, if the content of the container is a laundry detergent or beverage, light may result in photo degradation of the content or components of the content that adversely impact performance or appearance of the laundry detergent or taste, appearance, and/or safety of the beverage. Sometimes, the substance contained in the container may react adversely with the material constituting the container. In this circumstance, a barrier layer between the substance contained in the container and the primary wall material can be beneficial. Sometimes, a barrier layer between the substance contained in the container and the primary wall material may be desired to reduce diffusion of the substance through the wall of the container.

In extrusion molding process, co-extrusion can be used to form a multi-layer extruded parison that is subsequently blown into a finished container. In injection molding process, the techniques of co-injection and over molding can be used to form multi-layer preforms that are subsequently blown into finished containers having multiple layers. In each of these processes, there can be multiple technical and challenges to providing containers having two or more layers. The technical challenges include providing for the desired thickness of each layer, obtaining adequate coherency of the multiple layers, and designing and operating the machinery capable of co-extrusion or over-molding. The present state of the art is capable of dealing adequately with these challenges at the expense of increased cost, increased complexity, reduction of speed of production of equipment, and more challenging quality control.

In view of these technical and economical limitations, there is a continuing unaddressed need for blown containers, including multi-layer containers that can be formed simply and inexpensively.

SUMMARY OF THE INVENTION

A package comprising: a container; and a plug seal closure operatively engaged with an open end of the container; wherein the container comprises; a closed end opposing the open end; a container wall extending longitudinally between the closed end and the open end about a longitudinal axis; an end seam extending at least partially across the closed end; and a longitudinal overlapping seam extending from the end seam, a portion of the overlapping seam extending longitudinally along the container wall between the closed end and the open end; wherein the open end is narrower than at least a portion of the container away from the open end of the container; and wherein the closed end and the container wall consist of a one-piece thermoplastic substrate.

DETAILED DESCRIPTION OF THE INVENTION

Figure 1:
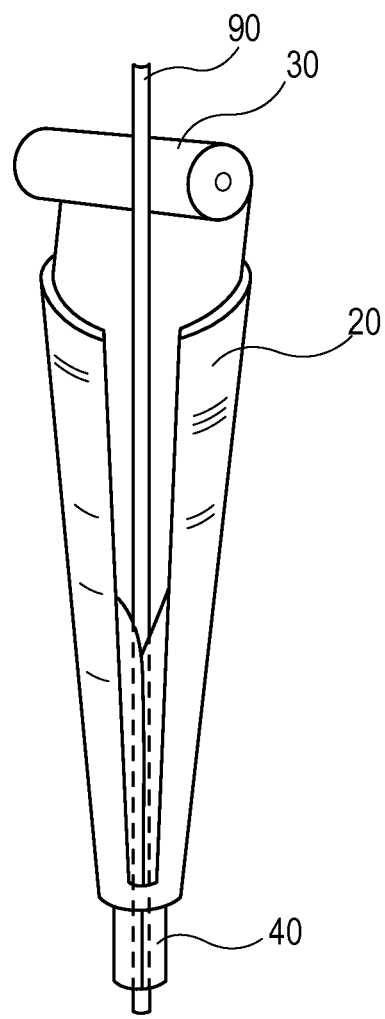
FIG. 1 is a drawing of an apparatus for forming a web into a loose conduit.

A container as contemplated herein can be formed as follows. First a web 30 can be provided wrapped around an unwinding roll 10, as shown in FIG. 1. The web 30 can be a planar web of thermoplastic sheet substrate comprising a composition selected from the group consisting of polyethylene terephthalate, polystyrene, polypropylene, polyethylene, polyvinyl chloride, nylon, ethyl vinyl alcohol, and laminated sheets or mixtures thereof. The web 30 can comprise a polyolefin. The web 30 can have a thickness of between about 200 µm and about 1000 µm. The web 30 can have a thickness of between about 300 µm and about 800 µm. The web 30 can comprise an ethylene vinyl alcohol (EVOH) layer having thickness between about 10 µm and about 30 µm. The web 30 can comprise an EVOH layer having thickness between about 10 µm and about 30 µm sandwiched between two layers of polyolefin material.

The web 30 can be a laminate of different materials. The web 30 can be a co-extrusion of different materials. The web 30 can consist of a singular polymeric material. The web 30 can have one or more barrier layers. Since it is generally thought to be less complicated to form flat webs comprised of multiple layers than it is to form multi-layered containers by the processes of extrusion blow molding, injection blow molding, injection stretch blow molding, and the like, the method disclosed herein of forming a planar web into a container and the resulting containers are thought to be particularly practical.

The web 30 can be fed through a forming guide 20 to gradually form the planar web 30 into a loose conduit 40. The forming guide 20 can be a funnel or be a section of a funnel or a portion of a funnel. The forming guide 20 can be a plate of metal or plastic having a shape such that as the web 30 is unwound from the roll 10, the web 30 is gradually deformed into the shape of a loose conduit 40 in a manner such that the loose conduit is free from wrinkles, folds, or creases. The forming guide 20 can be a solid material or can be providing with one or more of apertures, slots, grooves, ridges, and the like to help the flat web 30 be transitioned from a flat web 30 into loose conduit 40. The forming guide 20 can be a series of wires set in a frame to have the shape of a funnel or a section of funnel or portion of a funnel. The forming guide 20 can be a mesh or screen material. In essence, the forming guide 20 need only to be able to assist in transitioning the flat web 30 into loose conduit 40. The web 30 moves through the forming guide 20 to be formed into loose conduit 40. The web 30 and loose conduit 40 move towards the conformer. Movement of the web 30 and loose conduit 40 can be indexed with opening and closing of the conformer so as to move when the conformer is in an open position.

The forming guide 20 can be set around a blowing cane 90 that extends through the forming guide 20 such that that loose conduit 40 is wrapped around or partially around the blowing cane 90. The blowing cane 90 provides for pressurized and or heated gas that is used in a subsequent portion of the process to form the container by blow molding.

Figure 2:
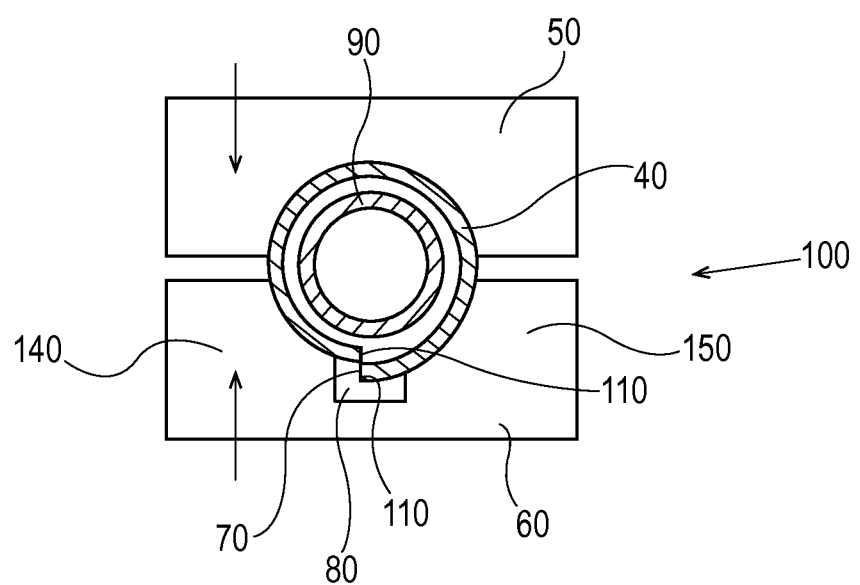
FIG. 2 is a drawing of the conformer in an open position.

The loose conduit 40 is fed into the conformer 100, as shown in FIG. 2. FIG. 2 is a top view of the conformer 100 in which the sections of the blowing cane 90 and loose conduit 40 are rendered. As shown in FIG. 2, the blowing cane 90 and loose conduit 40 fit within the conformer 100. The blowing cane 90 extends through the conformer 100 further down into the process. The loose conduit 40 is fed into the conformer 100 with the conformer 100 in an open position, as shown in FIG. 2 in which the first half 50 and second half 60 of the conformer 100 are in an open position. The conformer 100 comprises a first half 50 and a second half 60, the first half 50 and second half 60 being mounted about the blowing cane 90 and loose conduit 40. The first half 50 and second half 60 can translate towards and away from the blowing cane 90 and loose conduit 40. A hydraulic, lever, chain, or other mechanical system can be provided to translate the first half 50 and second half 60 of the conformer 100 towards and away from the blowing cane 90 and loose conduit 40. The second half 60 of the conformer 100 can be provided with an abutment 70 against which a lateral edge 110 of the loose conduit 40 can abut. As the loose conduit 40 is fed into the conformer 100, a lateral edge 110 of the loose conduit 40 can abut against the abutment 70 to true up lateral edges 110 of the loose conduit 40 with respect to one another so that the lateral edges 110 of the loose conduit 40 are parallel to one another and in an overlapping relationship with respect to one another.

Figure 3:
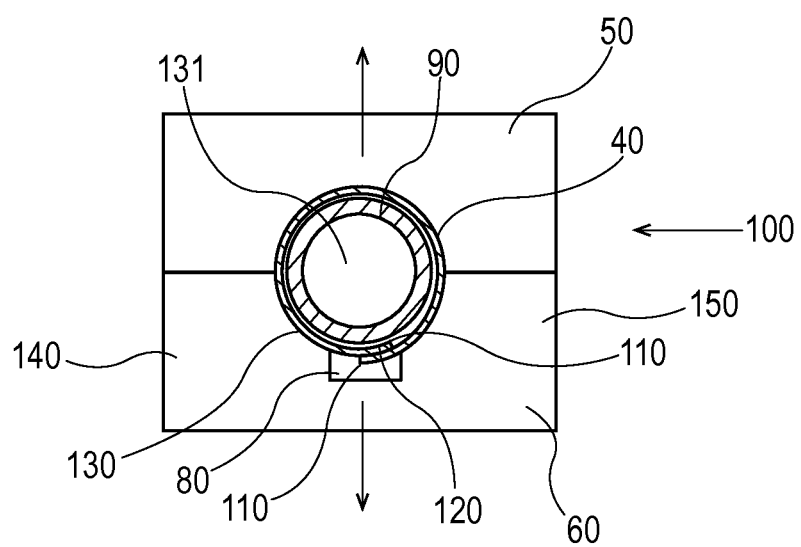
FIG. 3 is a drawing of the conformer in a closed position.
Figure 4:
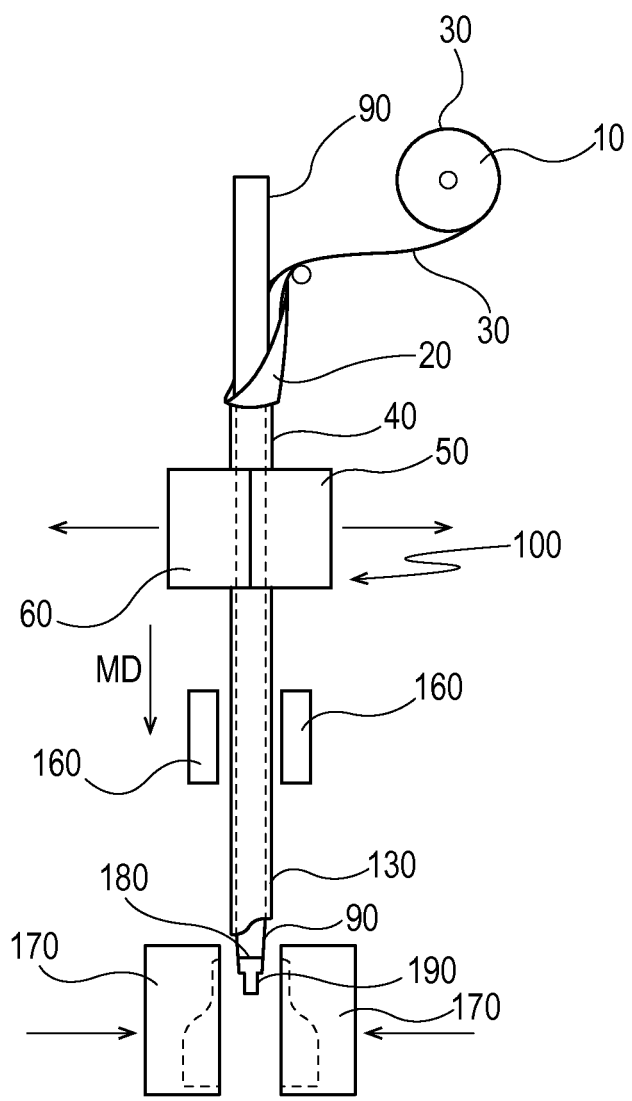
FIG. 4 is a drawing of an apparatus for forming a container.

The conformer 100 can be provided with a bonding implement 80 proximal the abutment 70. The bonding implement 80 can be an ultrasonic bonding apparatus or thermal bonding apparatus. When the conformer 100 is in the closed position, the bonding implement 80 can bond an overlapping portion 120 of the loose conduit 40 to form the intermediate tube 130. The bonded overlapping portion 120 becomes the overlapping seam on the container. The intermediate tube 130 can be described as being like a hose having an overlapping seam extending along the length of the hose. The abutment 70 can extend through the conformer 100 and the abutment 70 can be parallel to the direction of movement of the loose conduit 40. Described otherwise, the abutment 70 can extend partially along or completely along the second half 60 of the conformer 100 orthogonal to the direction of translation of the first mold half 50 and or second mold half 60. The second half 60 of the conformer 100 can have a first quarter 140 and a second quarter 150 with the first quarter 140 and second quarter 150 offset with respect to one another at the abutment 70. The amount of the offset can be greater than or equal to the thickness of the web 30. Sized and dimensioned as such, when the conformer 100 is transitioned from the open position shown in FIG. 2 to the closed position as shown in FIG. 3, one edge of the loose conduit 40 can slide over or fit within the other edge of the loose conduit 40 so as to be in an overlapping relationship wherein the lateral edges 110 of the loose conduit are moved into an overlapping relationship such that the lateral edges 110 are parallel to one another. The loose conduit 40 can have a cross section that is an approximately cylindrical shape. The loose conduit 40 can have a cross section that is an approximately oval shape. The first mold half 50 and the second mold half 60, and the portions thereof that are the first quarter 140 and second quarter 150, can be shaped to provide the desired shape of the loose conduit 40 and ultimately the desired shape of the intermediate tube 130 that is formed when the conformer 100 is closed and the overlapping portion 120 is bonded. The intermediate tube 130 can have an intermediate tube open area 131 that is the interior cross sectional area of the intermediate tube 130 measured orthogonal to the machine direction. As shown in FIG. 4, the loose conduit 40 can have a cross section that is an approximately tubular shape. The actual shape of the loose conduit 40 is not critical so long as loose conduit can be positioned about the blowing cane 90. The loose conduit 40 can fit around the blowing cane 90 and can move along the length of the blowing cane in the machine direction MD. The machine direction MD is the direction of travel of the web 30, loose conduit 40, intermediate tube 130, and container 200 in the process of making the container 200.

After the intermediate tube 130 is formed, the intermediate tube 130 can pass through a pre-heater 160. The pre-heater 160 can heat the intermediate tube 130 such that when the intermediate tube 130 enters the blow mold 170, the intermediate tube 130 is at a temperature such that the intermediate tube 130 can be blow molded into container. As shown in FIG. 4, the blowing cane 90 extends through the forming guide 20, loose conduit 40, conformer 100, and intermediate tube 130. The blowing cane 90 extends into the blow mold 170. The blowing cane 90 can provide gas, such as air to blow mold the finished container. The blow mold 170 defines a cavity into which a portion of the intermediate tube 130 is blown to form the finished container. The cavity defined by the blow mold 170 can have the shape of the finished container. Blow molding is a thermoforming process that imparts certain physical attributes to the finished container.

Figure 5:
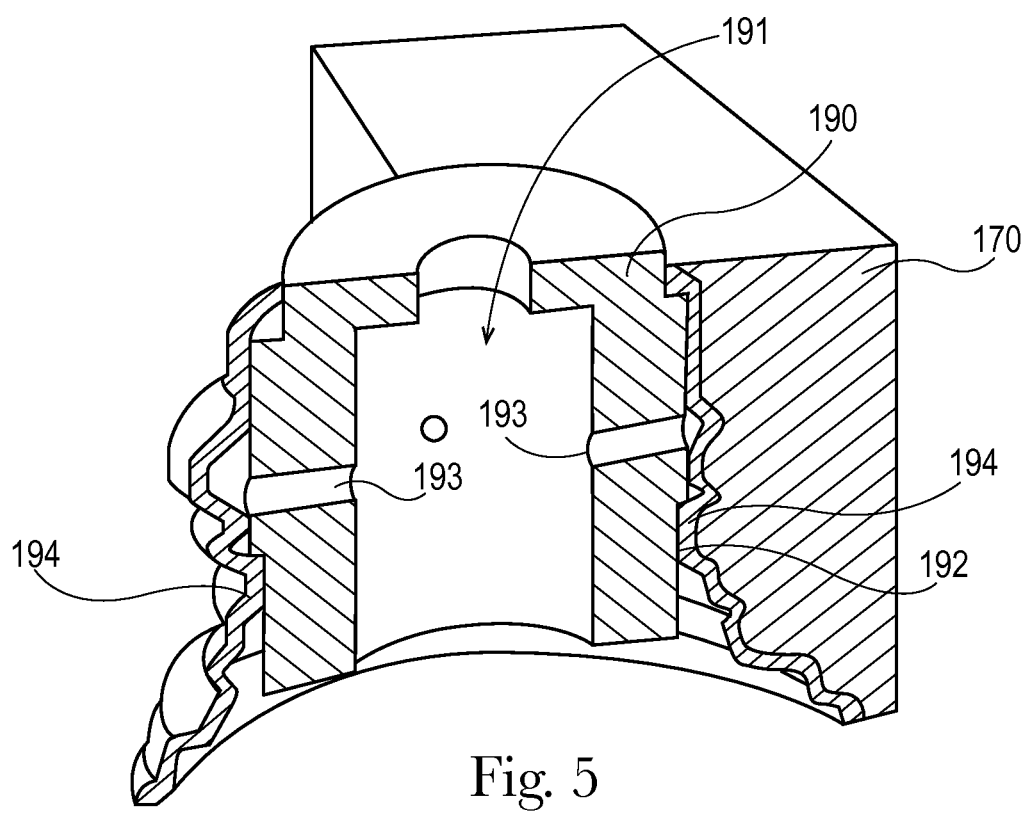
FIG. 5 is a partial view of a blow mold engaged with a calibration mandrel and a blown container.

A calibration mandrel 190 is connected to the blowing cane terminus 180. The calibration mandrel 190 is used to define the open end of the container. A cross section of a calibration mandrel 190 is shown in FIG. 5. The calibration mandrel 190 has an interior portion 191 and a bearing surface 192. The interior portion 191 is in fluid communication with the blowing cane 90 and comprises one or more ports 193 in fluid communication with the interior portion 191.

Figure 6:
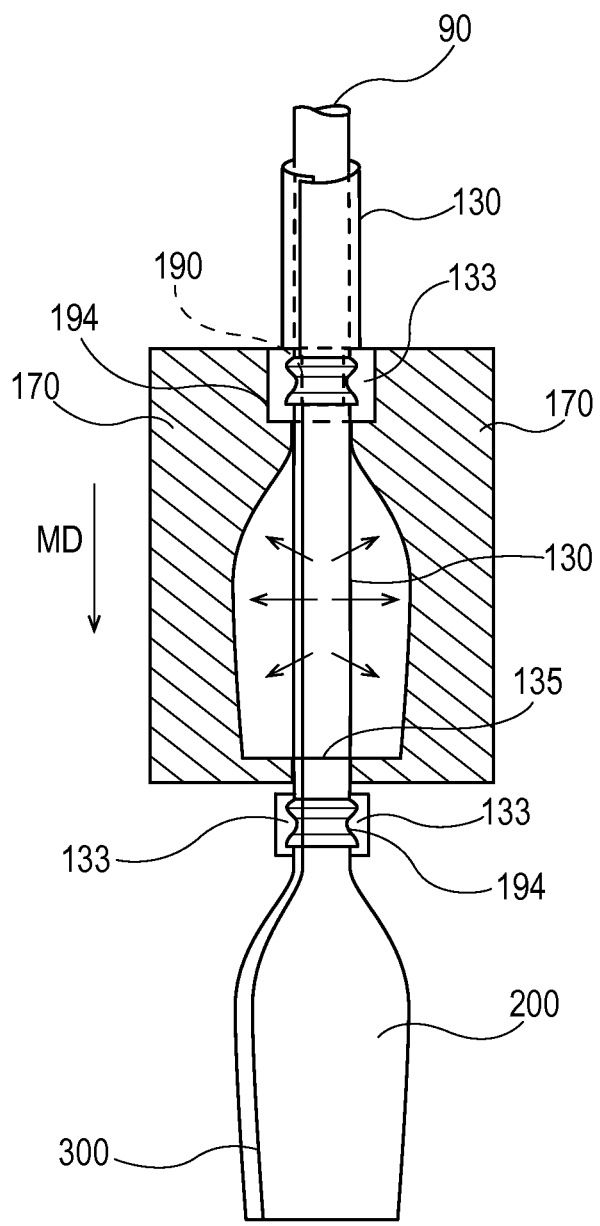
FIG. 6 cutaway view of an intermediate tube in a closed blow mold.

The intermediate tube 130 can be advanced over the blowing cane 90 and calibration mandrel 190 that is attached to the blowing cane 90. Once the intermediate tube 130 is in the blow molding position, the halves of the blow mold 170 close upon the intermediate tube 130. The blow mold 170 encloses a portion of the intermediate tube 130 and conforms at least a portion of the intermediate tube 130 to at least a portion of the calibration mandrel 190, as shown in FIG. 6. The intermediate tube 130 fits over the calibration mandrel 190 as the intermediate tube 130 moves in the machine direction MD. When the blow mold 170 closes about the intermediate tube 130, the blow mold 170 conforms the portion of the intermediate tube 130 that will define the open end of the container to the calibration mandrel 190.

Since the intermediate tube 130 loosely fits over the calibration mandrel 190, there is an excess of material that arises as the blow mold 170 closes upon the intermediate tube 130 and conforms the intermediate tube 130 to the calibration mandrel 190. The excess of material yields two flashings 133 proximal the location where the halves of the blow mold 170 meet. The amount of material in the flashing roughly corresponds with the amount of the intermediate tube 130 that can be eliminated so as to yield an open end of the container that has an open area orthogonal to the machine direction MD less than open area of the intermediate tube in that same direction. Thus, employing the calibration mandrel 190 as such allows the intermediate tube 130 to be formed into a container having an open end that has a smaller open area orthogonal to the machine direction MD than the open area of the intermediate tube 130 orthogonal to the machine direction MD. Without employing a calibration mandrel 190, the open end has the same or greater open area orthogonal to the machine direction MD as the open are of the intermediate tube 130 orthogonal to the machine direction MD. Such a container design may not be practical for containers having a narrow open end, such as a toothpaste tube.

As the halves of the blow mold 170 close upon the intermediate tube 130, the blow mold halves apply bearing pressure to the bonded overlapping portion 120 of the intermediate tube 130 against the underlying calibration mandrel 190 to form the calibrated neck 194 and compress out the overlapping portion 120 so that the overlapping portion 120 that subsequently becomes the overlapping portion of the container in the neck portion of the container is not as defined as the overlapping portion 120 of the intermediate tube 130 prior to passing through the blow mold 170 or the overlapping portion 120 the ends up forming the overlapping seam of the container.

The intermediate tube 130 is closed at a pinch seam 135 formed where the halves of the blow mold 170 close at the bottom of the blow mold 170, with that portion of the intermediate tube 130 ultimately becoming the closed end of the container 200.

Blowing air or gas, optionally heated or cooled, is blown into the portion of the intermediate tube 130 below the calibration mandrel 190 and blows out the intermediate tube 130 into conformance with the halves of the blow mold 170. Prior to, during, or after blow molding the container 200, the blow mold 170, blowing cane 90, and calibration mandrel 190 can move in the machine direction MD to pull the intermediate tube 130, loose conduit 40, and web 30 along in the machine direction MD to advance the process in an indexed manner.

After the container 200 is blow molded and advanced, the blow mold 170 can be opened. Then the blow mold 170 and the calibration mandrel 90 can be moved upstream relative to the machine direction MD. Once the blow mold 170 and calibration mandrel 90 are in the proper position, the blow mold 170 can be closed upon the next portion of the intermediate tube 130 and the steps repeated to form another container 200.

Figure 7:
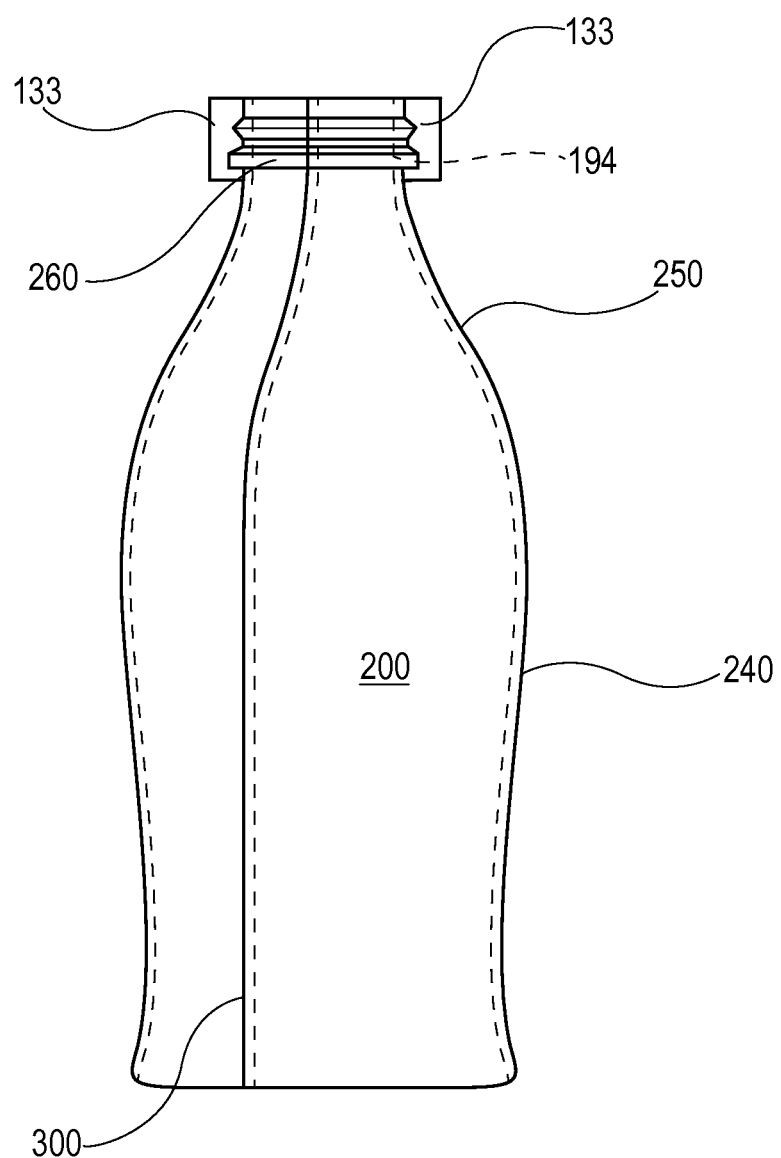
FIG. 7 is side view of a container after blow molding.
Figure 8:
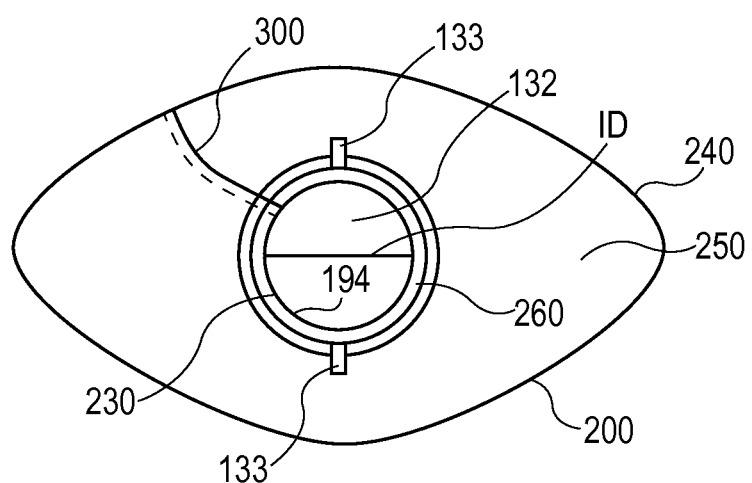
FIG. 8 is a top view of a container showing the open end.

The finished container 200 can be cut from the material upstream of the finished container 200. The cut can be made at or slightly above the calibrated neck 194 to leave the calibrated neck 194 and other portions of the container 200 intact. The flashings 133 can be removed from the container 200 via a cutting or breaking operation or removed by hand. A side view of a container 200 in which the flashings 133 are still attached to the container 200 in the neck portion 260 proximal the open end 230 is shown in FIG. 7. The flashings 133 can be thin fin protrusions extending away from the neck portion 260. Stated otherwise, the neck portion 260 can comprise two longitudinally extending flashings 133 projecting away from the longitudinal axis L on opposite sides of the neck portion 260. A top view of a container 200 in which the flashings 133 are still attached to the container 200 in the neck portion 260 proximal the open end 230 is shown in FIG. 8. The inside diameter ID is illustrated in FIG. 8. The calibrated neck 194 can have a calibrated neck open area 132, the open area measured orthogonal to the longitudinal axis L of the container 200. Since in making the container 200 the intermediate tube 130 is forced into the calibration mandrel 190 to form the calibrated neck 194, the calibrated neck open area 132 is less than the intermediate tube open area 131. The flashings 133 can be cut off or broken off in a subsequent processing step either by machine or by hand.

Figure 9:
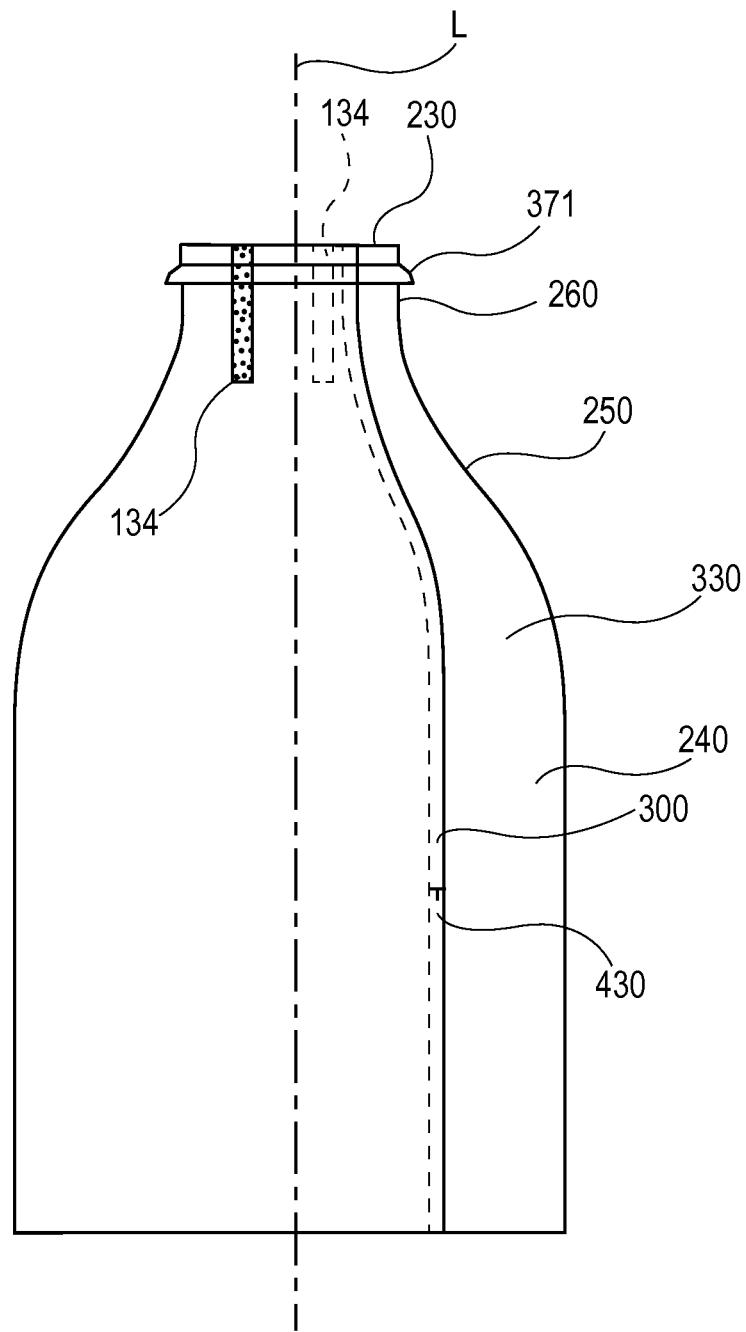
FIG. 9 is the open end of a container.

At the locations where the flashings 133 are removed from the container 200, two partially longitudinally extending flashing lines 134 remain as evidence of the prior existence of the flashings 133, as shown in FIG. 9. The flashing lines 134 can be located on opposite sides of the neck portion 260. The flashing lines 134 can extend at least partially down the neck portion 260 from the open 230 towards the closed end 220. The flashing lines 134 are portions of the neck portion 260 that have a surface profile that differs from the surface profile of portions of the neck portion 260 away from the flashing lines 134. That is, the flashing lines 134 are scars on the neck portion 260, such scars being formed when the flashings 133 are removed.

Also shown in FIG. 9 is overlap magnitude 430. The overlap magnitude 430 is a measure of the amount of overlap in the overlapping seam 300. The overlap magnitude 430 can vary as a function of distance from the closed end 220. The magnitude of overlap in the intermediate tube 130 is constant. When the intermediate tube 130 is blown to form the container, the amount of stretch that occurs is non-uniform. Portions of the container 200 that are stretched more relative to other parts of the container 200 will have a greater overlap magnitude 430. The overlap magnitude can be a minimum at or proximal to the closed end 230, as shown in FIG. 9. The overlap magnitude 430 can vary along the overlap seam 300.

Figure 10:
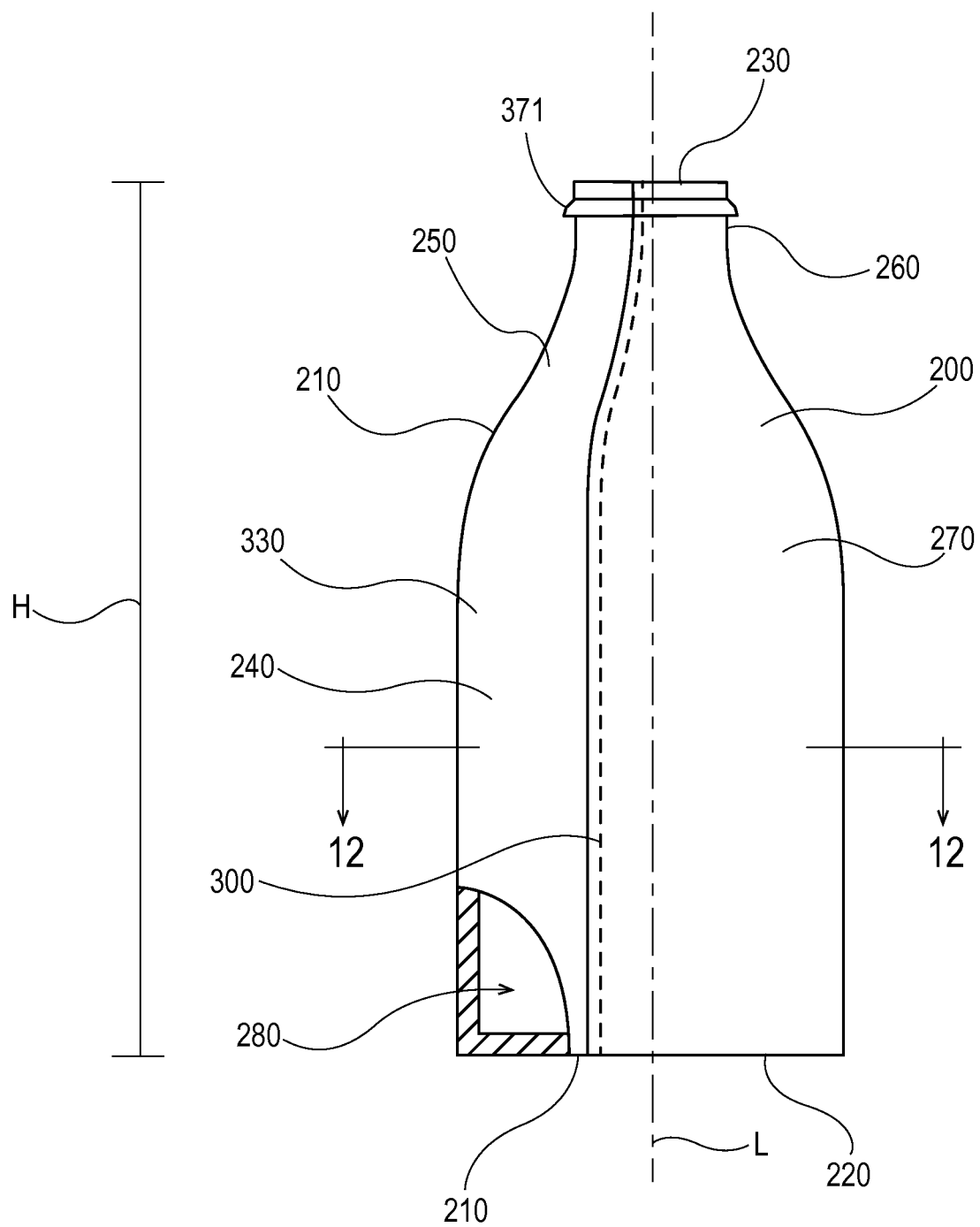
FIG. 10 is a drawing of a container, a portion of which is rendered in a section view to show the interior volume and interior surface of the container.

A container 200 formed by the process disclosed herein is shown in FIG. 10. The container can have closed end 220 and an opposing open end 230. The closed end 220 can be configured so as to be capable of resting upon a flat surface when the container 200 is in an upright position. The closed end 220 can be flat. A portion of the closed end 220 can have the shape of an annulus. The closed end 220 can have a plurality of feet sized and dimensioned to rest upon a flat surface.

The open end 230 can be the portion of the container 200 through which the contents of the container 200 are dispensed. The shape of the open end 230 is defined by the shape of the container wall 270 proximal the open end 230. The open end 230 can be defined by a circular opening in the container 200. The neck portion 260 can comprise a snap bead 371 positioned about the neck portion 260 proximal the open end 230. The snap bead 371 can provide for a fitment to which a plug seal closure can connect to close the container 200. The plug seal closure can be operatively engaged with the snap bead 371. The snap bead 371 can be proximal the open end 230.

Typically, a container 200 can be defined by a main body portion 240, a shoulder portion 250, and a neck portion 260. The main body portion 240 can account for more than about 50% of the total interior volume 280 of the container 200. The neck portion 260 can comprise less than about 5% of the interior volume 280 of the container 200. Together, the main body portion 240, shoulder portion 250, and neck portion 260 can account for 100% of the interior volume 280 of the container 200. The shoulder portion 250 can be the transition between the main body portion 240 and the neck portion 260. The neck portion 260 is proximal the open end 230. The shoulder portion 250 is between the neck portion 260 and the main body portion 240. Described otherwise, the shoulder portion 250 can be adjacent to both the neck portion 260 and the main body portion 240.

The container 200 can have a container wall 270 extending longitudinally between the closed end 220 and the open end 230 about a longitudinal axis L. The container wall 270 can comprise the main body portion 240, the shoulder portion 250, and neck portion 260. Together, the closed end 220 and the container wall 270 define the interior volume 280 of the container 200. Use of the term longitudinal axis L is not meant to necessarily imply any degree of symmetry about the longitudinal axis L. It is possible that the container wall 270 is asymmetric about the longitudinal axis. It is possible that the container wall 270 is symmetric about the longitudinal axis. It is possible that the entire container 200 is symmetric about the longitudinal axis L. It is possible that the closed end 220 and the container wall 270 are symmetric about the longitudinal axis. Rather, the longitudinal axis L is an axis passing through the open end 230 about which the container wall 270 extends. The closed end 220 can be sized and dimensioned so that the container 200 is free-standing on the closed end 220.

The container wall 270 can be considered to have an interior surface 320 defining the interior volume 280 of the container and an exterior surface 330 opposing the interior surface. Each of the main body portion 240, shoulder portion 250, and neck portion 260 can be considered to have an interior surface 320 and an exterior surface 330. The interior surface 320 can be oriented towards the longitudinal axis L and the exterior surface 330 can be oriented away from the longitudinal axis L.

Figure 11:
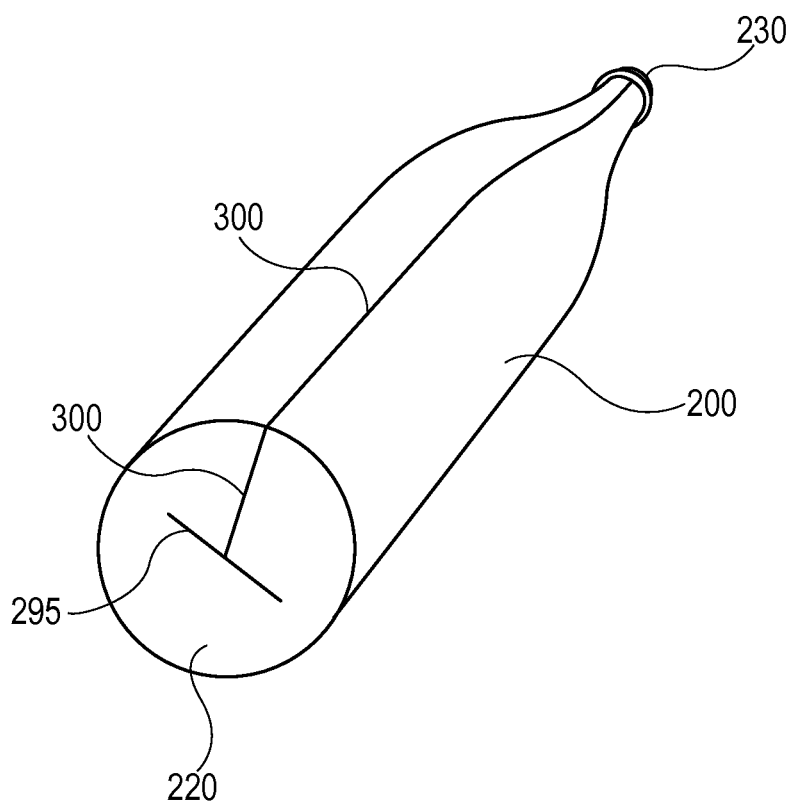
FIG. 11 is perspective view of container in which the closed end of the container is visible.

A perspective view of a container 200 showing the closed end 220 is shown in FIG. 11. As shown in FIG. 11, the container 200 can comprise an end seam 295 extending at least partially across the closed end 220 of the container. The end seam 295 can arise when the blow mold 170 is closed upon the intermediate tube 130. At that stage of the process the end seam 295 extends across the intermediate tube 130. Then the intermediate tube 130 is blown up to form the container 200. A portion of the closed end 220 of the container 200 can be formed of material that was formerly part of the wall of the intermediate tube 130.

The container 200 can further comprise a longitudinal overlapping seam 300 extending from the end seam 295. The longitudinal overlapping seam 300 can extend from any portion of the overlapping seam 200, for instance at one of the ends of the end seam 295 or at any location between ends of the end seam 295. A portion of the longitudinal overlapping seam 300 can extend longitudinally along the container wall 270 between the closed end 220 and the open end 230 of the container. The overlapping seam 300 can arise in the finished container 200 as a result of the conformer 100 closing upon loose conduit 40 in the process of forming the intermediate tube 130. The end seam 295 extending at least partially across the closed end 220 of the container can be a smoothed out pinch seam 135. That is the end seam 295 may be substantially smooth after a pinch seam 135 is formed in the intermediate tube 130 and is then deformed by blow molding to form the closed end 220 of the container.

The closed end 220 and the container wall 270 can consist of a one-piece thermoplastic substrate 210. That is, together, the closed end 220 and the container wall 270 can be formed from a single portion of web 30 that is shaped into a structure that is subsequently blow molded into a container 200. Stated otherwise, the container 200 can be described as being free from seams other than a seam extending at least partially across the closed end 220 and an overlapping seam 300 extending from the end seam 295, a portion of the overlapping seam 300 extending longitudinally along the container wall 270 between the closed end 220 and the open end 230. This construction of the container 200, in which the neck portion 260, shoulder portion 250, container wall 270, and closed end 220 are formed of a single integral substrate is practical in that the manufacturer is not required to assemble different parts of the container. This is unlike the construction of containers such as toothpaste tubes that are presently in the market in which the shoulder portion 250 and neck portion 260 are typically formed from an injection molded plastic insert that is bonded to the container wall 270 that is formed from a flexible substrate.

It is also thought that by having the shoulder portion 250 and container wall 270 formed of a single integral substrate that there is less potential for a leak to occur at such location since there is no potential for a leaky bond between the shoulder portion 250 and the container wall 270. Stated otherwise, the juncture between the shoulder portion 250 and the container wall 270 can be free from a seam. Further, the juncture between the neck portion 260 and the shoulder portion 250 can be free from a seam forming the juncture.

Further, the juncture between the shoulder portion 250 and the container wall 270 can be free from a seam forming the juncture.

Since the closed end 220 and container wall 270 consists of a single portion of web 30, the end seam 295 across at least a portion of the closed end 220 of the container extends to or connects to overlapping seam 300 extending longitudinally along the container wall 270. As such, the overlapping seam 300 can be continuous across the boundary between the closed end 220 and container wall 270. The overlapping seam 300 can extend along the height H of the container 200. The height H of the container 200 extends between the closed end 220 and the open end 230.

Figure 12:
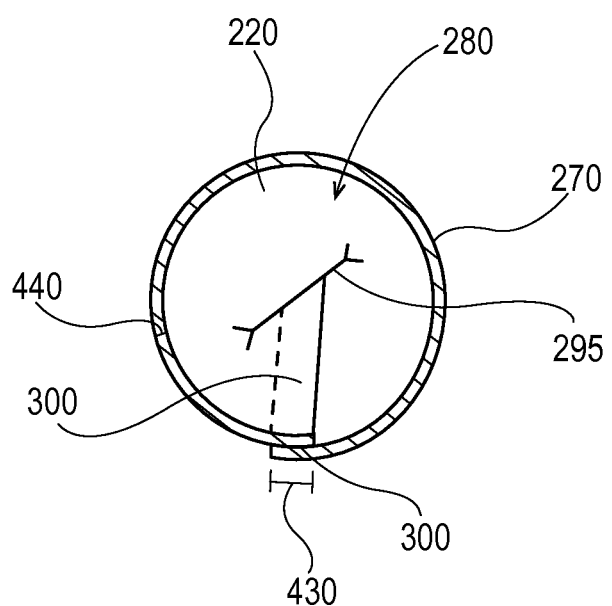
FIG. 12 is a cross section of the container of FIG. 10 as marked in FIG. 10.

A cross section of the container 200 shown in FIG. 10 is shown in FIG. 12, the view being taken to show the closed end 220. As shown in FIG. 12, the overlapping seam 300 can extend across part of the closed end 220. The overlapping seam 300 across part of the closed end 220 can be connected to the end seam 295. As shown in FIGS. 11 and 12, the overlapping seam 300 can extend from the end seam 295 across part of the closed end 220 of the container 200 to the container wall 270 and longitudinally along the container wall 270 between the closed end 220 and open end 230. Stated otherwise, a portion of the longitudinal overlapping seam 300 can extend longitudinally along the container wall 270 between the closed end 220 and the open end 230 of the container and between the container wall 270 and the end seam 295. As such, the container 200 can comprise an overlapping seam 300 that is connected to the end seam 295 and extends partially across the closed end 220 of the container and longitudinally along at least part of the container wall 270 between the closed end 220 and the open end 230.

As shown in FIG. 12, at mid-height of the container 200, height being the straight line height between the closed end 220 and open end 230 parallel to the longitudinal axis L, the overlapping seam 300 along the container wall 270 has an overlap magnitude 430 of more than about 1.5 times the thickness 440 of the container wall 270 as measured at a distance from the overlapping seam 300 equal to the magnitude of overlap 430. As a result of blow molding to form the container 200, the container 200 can have a variety of thicknesses at different locations on the container. For example, the thickness of the container wall 270 in the main body portion 240 may be different from the thickness of the closed end 220, shoulder portion 250, and neck portion 260. The overlap magnitude 430 may vary at different locations along the overlapping seam 300 along the height H of the container 200. To provide for a common location at which to measure the overlap magnitude 430 regardless of height H of the container 200, the comparison of the overlap magnitude 430 can be taken at mid-height of the container 200. Without being bound by theory, it is thought that a representative measure of thickness of the container wall 270 can be taken at a distance from the overlapping seam equal to the overlap magnitude 430.

Such location is relatively near the seam but yet not so far from the overlapping seam 300 so as to be at a completely different part of the container 200, such as at a handle, if present, or some other decorative or functional part of the container 200. Further, thickness of the container wall 270 at the overlapping seam 300 along the height H of the container may vary as a function of location. Greater overlap might be measured at the maximum axial dimension of the container 200 as compared to the shoulder portion 250 or neck portion 260 since that portion of the container is stretched more during formation of the container 200 than the shoulder portion 250 or neck portion 260. The overlapping seam 300 at mid-height can be thicker than any other portion of the container wall 270 at mid-height.

Figure 13:
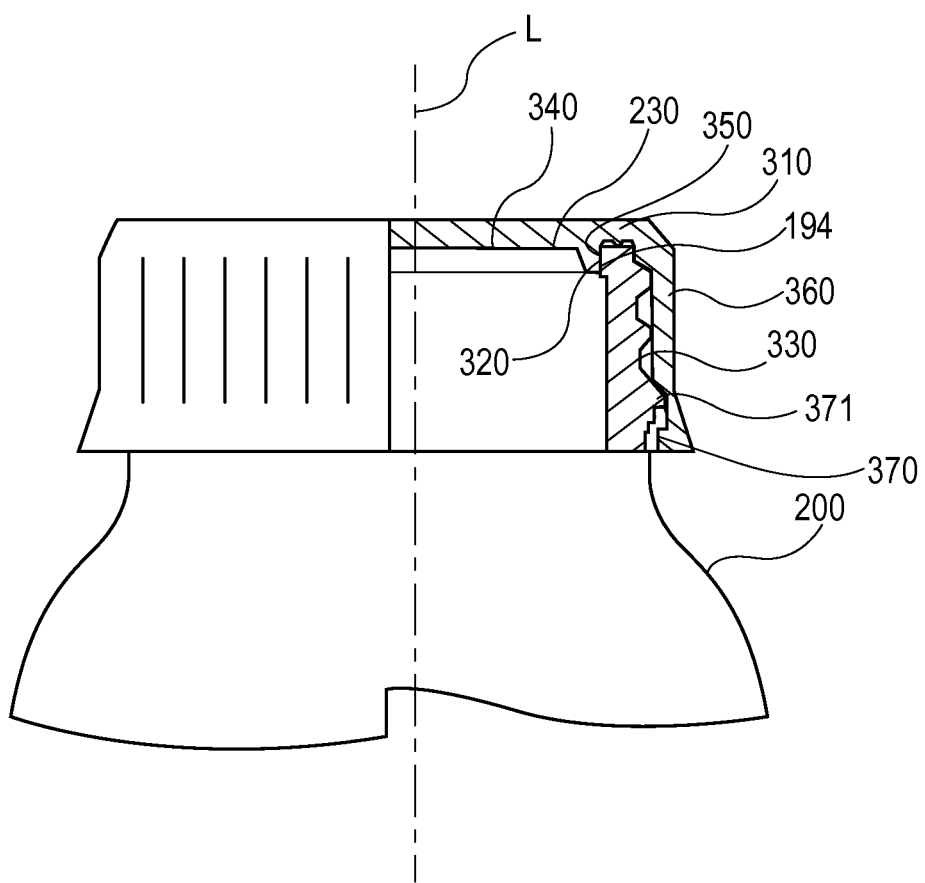
FIG. 13 is a drawing of a snap-on plug seal closure operatively engaged with the open end of the container, a portion of the plug seal closure and container rendered in a section view.

A plug seal closure 310 can be operatively engaged with the open end 230 of the container 200, as shown in FIG. 13. For a plug seal closure 310 to securely close a container 200, the open end 230 can be provided with a calibrated neck 194. A plug seal closure 310 is a closure in which a wedging surface 350 of the plug seal closure 310 wedges against the interior surface 320 of the open end 230 of the container 200. The wedging surface 350 can be a surface that abuts the interior surface 320 of the open end 230 of the container 200 in a facing relationship. That is the wedging surface 350 can be parallel to the interior surface 320 of the open end of the container 200. The wedging surface 350 can be wedge shaped in which the sloped surface of the wedging surface 350 contacts the interior surface 320 of the open end 230 of the container 200. The wedging surface 350 can extend from the sealing face 340 of the plug seal closure 310. The sealing face 340 is the portion of the plug seal closure that is in facing relationship with interior volume 280 of the container 200. The sealing face 340 can be oriented orthogonal to the longitudinal axis L. Optionally, the portion of the plug seal closure 310 that wedges against the interior surface 320 of the open end 230 of the container 200 can be an annulus that extends from the sealing face 340 of the plug seal closure 310. The wedging surface 350 can extend from the sealing face 340 towards the interior volume 280 of the container 200.

The plug seal closure 310 can comprise a sealing face 340 and a closure wall 360 that extends from the sealing face 340. The closure wall 360 can extend down along a portion of the exterior surface 330 of the container 200, in particular the neck portion 260, and be operatively engaged with a portion of the exterior surface 330 of the container 200, for example the exterior surface 330 of the neck portion 260. The plug seal closure 310 can be an injection molded part. The plug seal closure 310 can be formed from a plastic material that can be injection molded. The plug seal closure 310 can be comprised of polypropylene. The plug seal closure 310 can be comprised of polyethylene.

The closure wall 360 can comprise a tab 370 extending inwardly from the closure wall 360 towards the container 200 and fit with a corresponding snap bead 371 disposed on the exterior surface 330 of the container wall 270. The tab 370 and snap bead 371 can act to removeably lock the plug seal closure 310 to the container 200, in particular proximal the open end 230 or in other words, proximal the neck portion 260.

The plug seal closure 310 is sometimes referred to in the art as a valve seal. A plug seal closure 310 is a sealing mechanism that analogous to how a cork seals an opening in a bottle. For a plug seal closure 310 to reliably seal a package, the inside dimensions of the open end 230 of the container 200 can be provided within a certain tolerance. An irregular interior surface 320, such as dents, scratches, deformities, dimensional irregularities, and the like, of the open end 230 of the container 200 can reduce the efficacy of a plug seal closure 310. The plug seal closure 310 can be a snap-on plug seal closure 310 as shown in FIG. 13.

Figure 14:
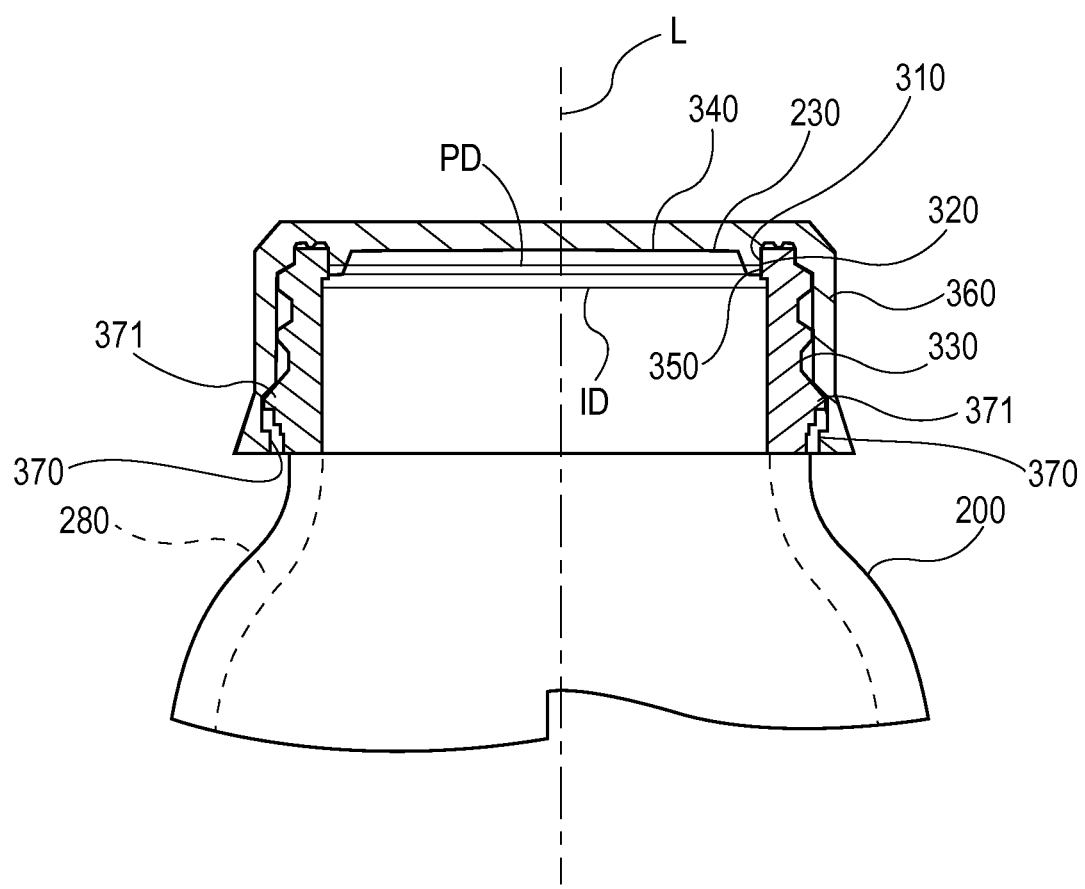
FIG. 14 is a drawing of a snap-on plug seal closure operatively engaged with the open end of the container, a portion of the plug seal closure and container rendered in a section view.

As shown in FIG. 14, the plug seal closure 310 can have a plug diameter PD. The plug diameter PD is the outer diameter of wedging surface 350. The plug diameter PD of the wedging surface 350 is measured from the longitudinal axis L of the plug seal closure 310 to the wedging surface 350. It can be practical that there is what is referred to in the art as interference between the wedging surface 350 and the interior surface 320 of the open end 230 of the container 200. For an open end 230 that is circular, there can be interference between the wedging surface 350 and the inside diameter ID of the open end 230 of the container 200. By interference it is meant that the wedging surface 350 is sized and dimensioned such that it has dimensions in directions orthogonal to the longitudinal axis L that are slightly larger than the dimensions of the interior surface 320 of the open end 230 of the container 200. The plug seal closure 310 can comprise a wedging surface 350 in facing relationship with an interior surface 320 of the open end 230 of the container 200, wherein the wedging surface 350 is sized and dimensioned to interfere with the interior surface 320. The wedging surface 350 can interfere with the interior surface 320 of the open end 230 of the container 200. For a wedging surface 350 having a circular outer periphery, the interference can be the absolute value of the difference between the plug diameter PD of the plug seal closure 310 and the inside diameter ID of the open end 230 of the container 200. Arranged as such, the wedging surface 350 is wedged into the open end 230 of the container 200 so as to fit tightly, thereby reducing the potential for a leak to develop or for the plug seal closure 310 to become dislodged from the open end 230 of the container 200. Without being bound by theory, it is thought that the magnitude of the interference between the wedging surface 350 and open end 230 of the container 200 can range from greater than zero to about 0.1 mm. The magnitude of the interference between the wedging surface 350 and open end 230 of the container 200 can range from greater than zero to about 1 mm. If the magnitude of interference is zero, then the wedging surface 350 just fits flush within the open end 230. The magnitude of the interference between the wedging surface 350 and open end 230 of the container 200 can range from about 0.1 mm to about 1 mm. The magnitude of the interference between the wedging surface 350 and open end 230 of the container 200 can range from about 0.2 mm to about 1 mm. By having interference between the wedging surface 350 and the interior surface 320 of the open end 230 of the container 200, the plug seal closure 310 is fit tightly within the open end 230 of the container 200, thereby providing a sealed closure for the container 200. It is contemplated that the container 200 can have a non-circular open end 230 and a corresponding non-circular wedging surface 350.

Figure 15:
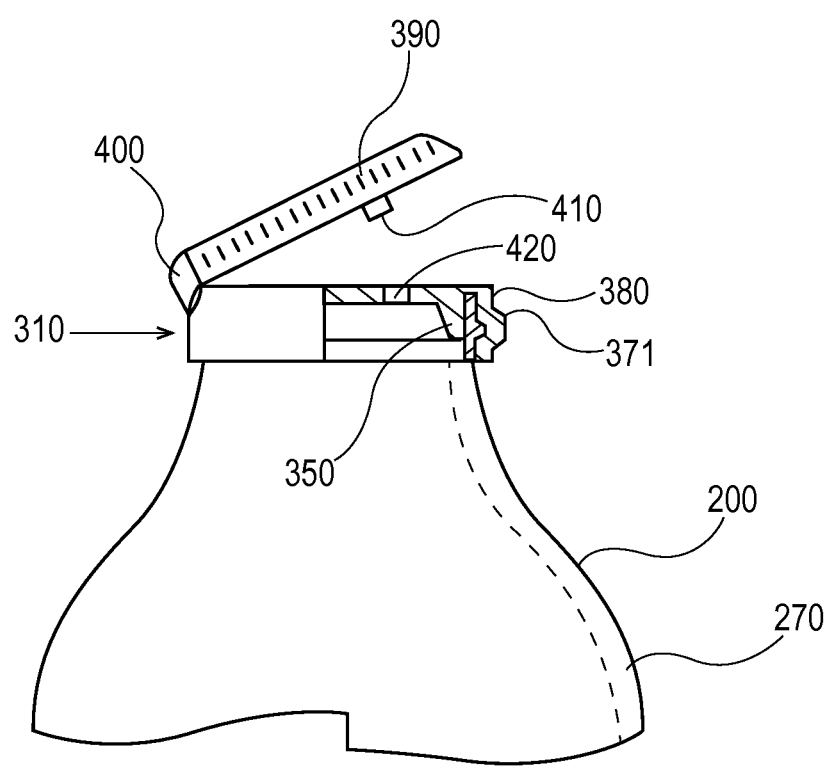
FIG. 15 is a drawing of a flip-top plug seal closure operatively engaged with the open end of the container, a portion of the plug seal closure and container rendered in a section view.

The plug seal closure 310 can be a flip-top plug seal closure 310, as shown in FIG. 15. As shown in FIG. 15 the plug seal closure 310 can comprise a collar 380 that fits to the open end 230 of the container 200. A flip-top 390 can be hingedly connected to the collar 380 so that the flip-top 390 can be rotated about a hinge 400 to open and close the flip top plug seal closure 310. The flip-top 390 can have a spud 410 extending from the flip-top 390 that can be sealingly engaged with an opening 420 in the collar 380. The spud 410 can provide for a plug seal.

Figure 16:
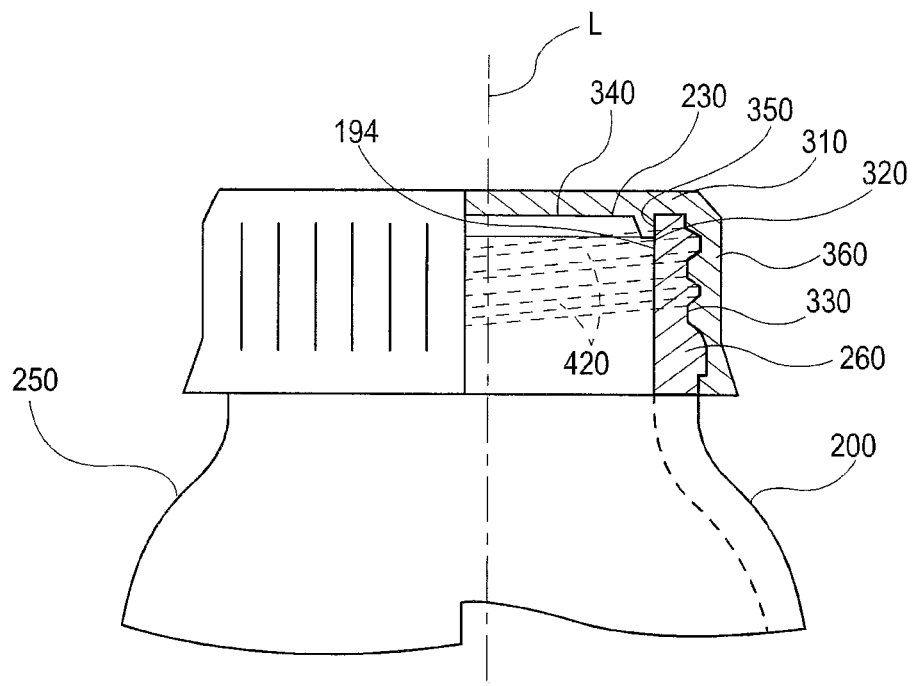
FIG. 16 is a drawing of an internally threaded plug seal closure operatively engaged with the open end of the container, a portion of the plug seal closure and container rendered in a section view.
Figure 20:
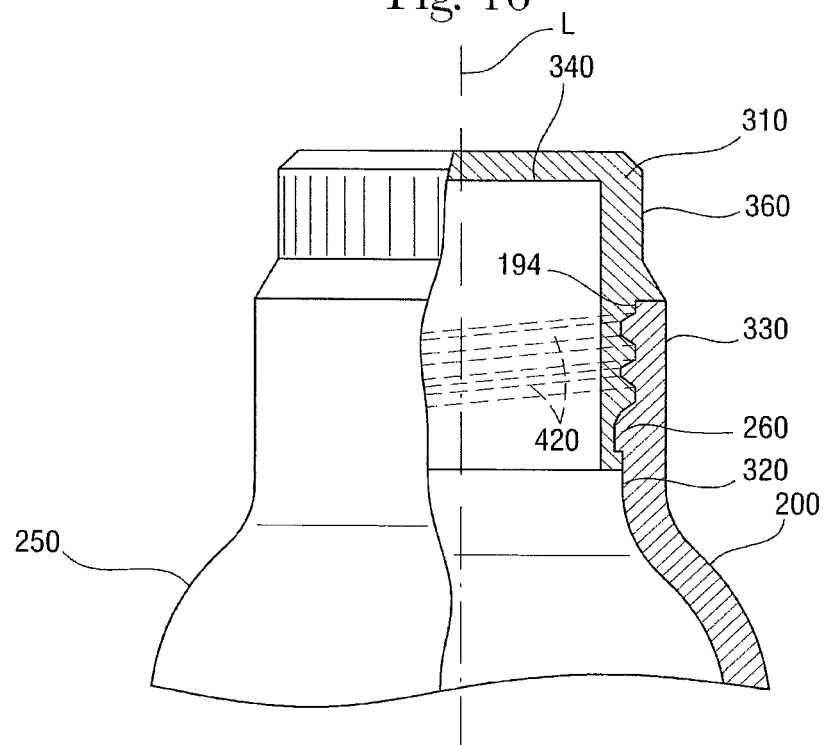
FIG. 20 is a drawing of an externally threaded plug seal closure operatively engaged with the open end of the container, a portion of the plug seal closure and container rendered in a section view.

The plug seal closure 310 can be a threaded plug seal closure 310, as shown in FIGS. 16 and 20. That is, the plug seal closure 310 can be screwed onto and off of the container 200. The closure wall 360 can comprise one or more threads 420 extending away from the closure wall 360 towards the exterior or interior surface 330 of the container 200 and the open end 230 of the container can comprise one or more corresponding threads 420.

The open end 230 can be a calibrated neck 194. A calibrated neck 194 is an opening having dimensional tolerance sufficiently small so as to permit a plug seal closure 310 to be engaged with the container 200 with such plug seal closure 310 being leak-free under the physical stresses withstood by the package during the life-cycle of the package. A calibrated neck 194 can be formed by blowing the finished container 200 with a calibrated blow pin having a tip that is sized and dimensioned to form the inside diameter of the open end 230 of the container 200. The tip can compress the plastic into the thread area that is cut into the blow mold 170 if a thread is to be provided.

Figure 17:
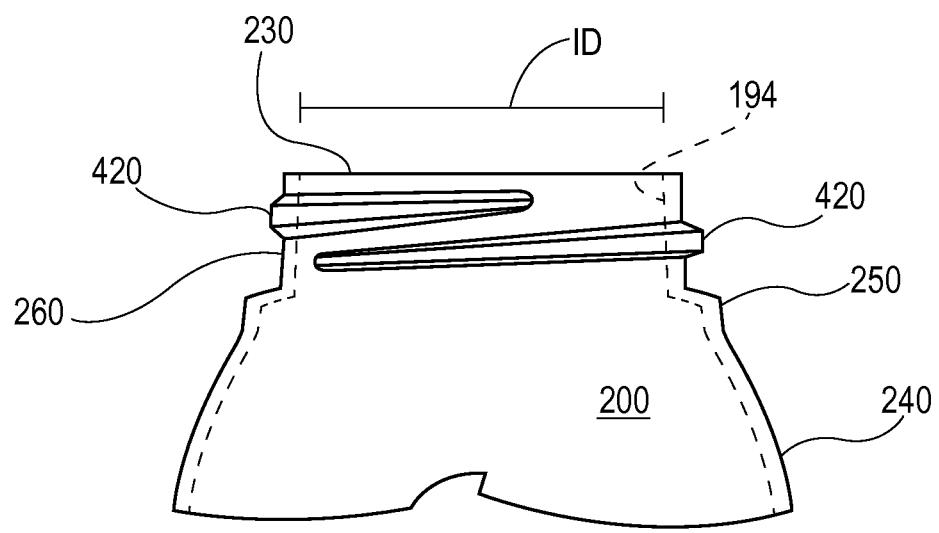
FIG. 17 is a drawing of the open end of a container illustrating the dimension for the inside diameter.

FIG. 17 is an illustration of an open end 230 of a container 200. As shown in FIG. 17, the open end 230 can have an inside diameter ID spanning the open end 230. The tolerance of the inside diameter ID can be plus or minus about 2% of the inside diameter ID. That is, all inside diameters ID measured at the open end 230 will be within plus or minus about 2% of one another, or even plus or minus about 1.2% of one another, or even plus or minus about 1% of one another.

Figure 18:
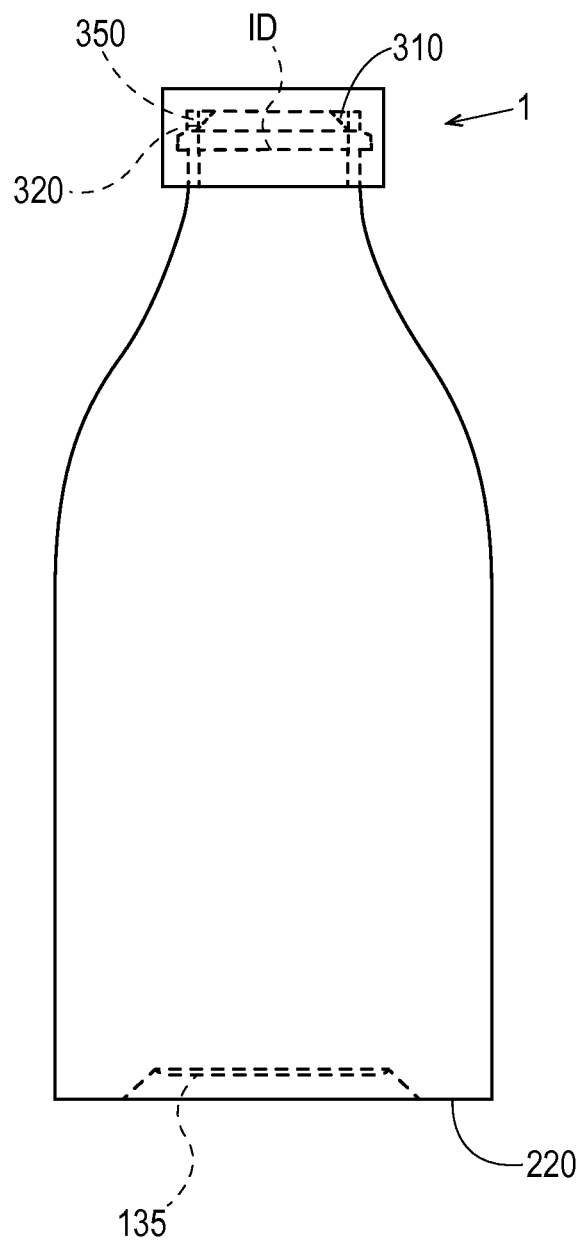
FIG. 18 is a drawing of a package comprising a container and a plug seal closure operatively engaged with an open end of the container.

Together, the container 200 and the plug seal closure 310 can form a package 1, as shown in FIG. 18. That is, the package 1 can comprise a container 200 and a plug seal closure 310 engaged with the open end 230 of the container 200. The package 1 can be a package for liquid laundry detergent, powdered laundry detergent, shampoo, liquid soap, cooking oil, toothpaste, water, or other liquid, gel, or otherwise pourable substance. The purpose of the plug seal closure 310 is to ensure with a commercially reasonable degree of certainty that the package will not leak during the lifecycle of the package. For instance, the seal between the plug seal closure 310 and the container 200 may need to be robust enough such that the container 200 can be hot filled, the package 1 can be stored in boxes that are stacked on a pallet, the package 1 can withstand being dropped from a storage or sales shelf, the package 1 can endure changes in temperature and pressure, and the package 1 can undergo freezing and thawing cycles, all without leaking within a reasonable degree of certainty. The seal between the plug seal closure 310 and the container 200 may need to be robust enough such that contents of the package 1 are separated from the external environment so as to prevent cross contamination of the contents of the package 1, degradation of the contents of the package 1, and chemical reaction between the contents of the package 1 and substances external to the package.

Figure 19:
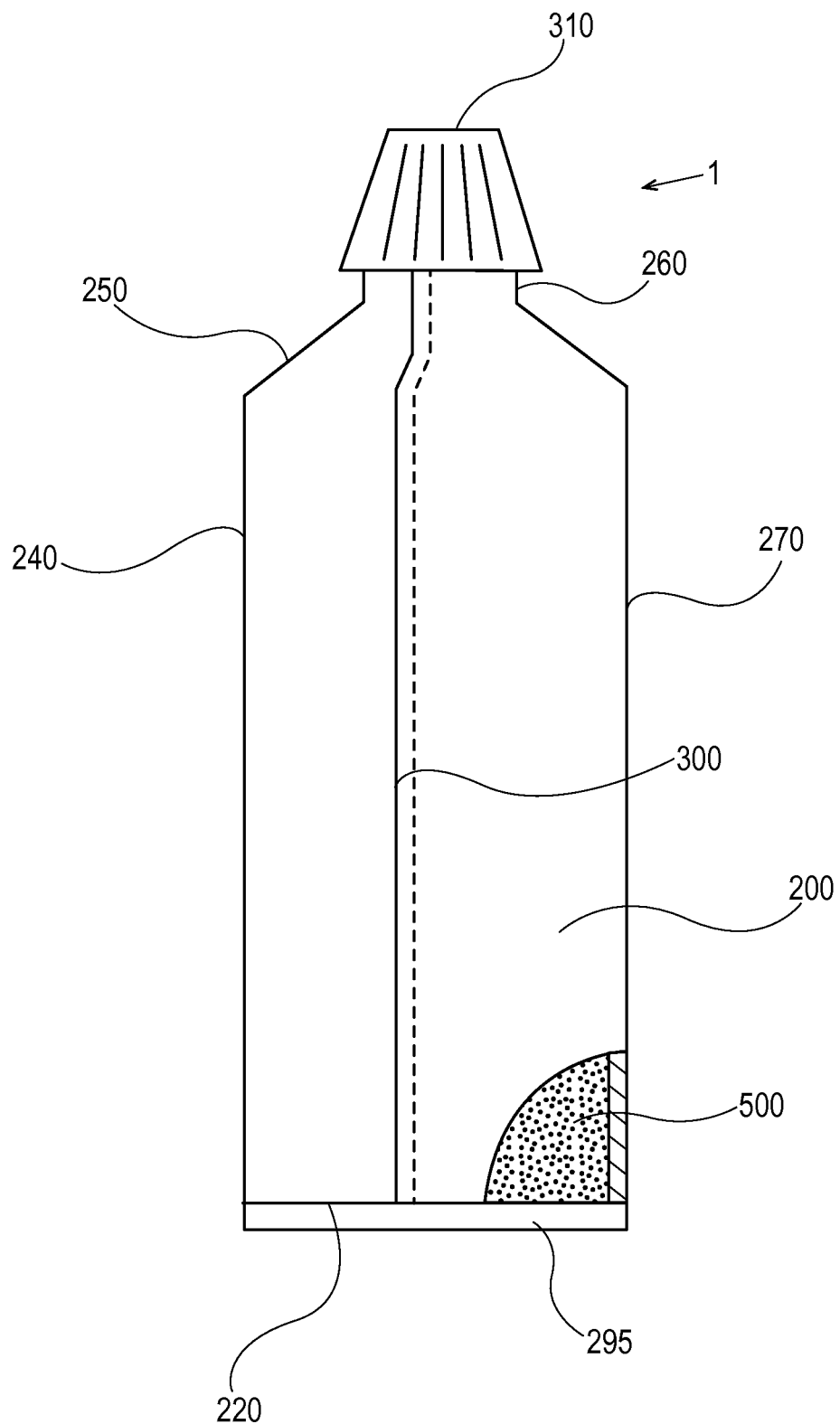
FIG. 19 is a tooth paste tube.

The package 1 can be a squeezable tooth paste tube for a tooth paste 500 contained in the container 200, as shown in FIG. 19.

As disclosed herein, the container 200 can be formed by the steps of: forming a planar web 30 into a loose conduit 40 having an overlapping portion 120, the loose conduit 40 positioned about a blowing cane 90; bonding the overlapping portion 120 of the loose conduit 40 to form an intermediate tube 130 having an intermediate tube open area; advancing the intermediate tube 130 over the blowing cane 90 and the calibration mandrel 190 attached to the blowing cane 90; closing the blow mold 170 to enclose the intermediate tube 130 and conform at least a portion of the intermediate tube 130 to at least a portion of the calibration mandrel 190 to form a calibrated neck 194 having a calibrated neck open area, wherein said calibrated neck open area is less than the intermediate tube open area; blow molding the intermediate tube 130 to form the container 200. The container 200 can have an open end 230 and the open end 230 can be a calibrated neck. The calibrated neck 194 can have an inside diameter ID spanning the open end 230. The inside diameter ID can have a tolerance within plus or minus about 2% of the inside diameter ID. The inside diameter ID can have a tolerance within plus or minus about 1.2% of the inside diameter ID. The inside diameter ID can have a tolerance within plus or minus about 1% of the inside diameter ID. The closed end 220 can be sized and dimensioned so that the container 200 is free standing on the closed end 220. The thermoplastic substrate can comprise a composition selected from the group consisting of polyethylene terephthalate, polystyrene, polypropylene, polyethylene, polyvinyl chloride, nylon, ethyl vinyl alcohol, and mixtures thereof. The container 200 can have a height H extending between the open end 230 and said closed end 220 and the container wall 370 can have a thickness away from the overlapping seam 300, wherein at mid-height the overlapping seam 300 along the container wall 270 has an overlap magnitude of more than about 1.5 times said thickness of the container wall 270 as measured at a distance from the overlapping seam 300 equal to the overlap magnitude. The container 200 can have a height H extending between the open end 230 and the closed end 220 and the container wall 270 has a thickness away from the overlapping seam 300, wherein the overlapping seam 300 at mid-height is thicker than any other portion of the container wall 270 at mid-height. The open end 230 can be threaded. The open end 230 can be threaded on an outer surface of the open end 230. The open end 230 can be threaded on an inner surface of the open end 230. The neck portion 260 can comprise two longitudinally extending flashings 133 projecting away from the longitudinal axis L on opposite sides of the neck portion 260.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A package comprising:
   a container having an open end; and
   a plug seal closure operatively engaged with said open end of said container;
   wherein said container comprises;
   a closed end opposing said open end;
   a container wall extending longitudinally between said closed end and said open end about a longitudinal axis;
   an end seam extending at least partially across said closed end; and
   a longitudinal overlapping seam extending from said end seam, a portion of said overlapping seam extending longitudinally along said container wall between said closed end and said open end;
   wherein said open end is narrower than at least a portion of said container away from said open end of said container; and
   wherein said closed end and said container wall consist of a one-piece thermoplastic substrate; and
   wherein said container has height extending between said open end and said closed end and said container wall has a thickness away from said overlapping seam, wherein at mid-height said overlapping seam along said container wall has an overlap magnitude of more than 1.5 times said thickness of said container wall as measured at a distance from said overlapping seam equal to said overlap magnitude.

2. The package of claim 1, wherein said open end is a calibrated neck.

3. The package of claim 2, wherein said calibrated neck has an inside diameter spanning said open end.

4. The package of claim 3, wherein said inside diameter has a tolerance within plus or minus 2% of said inside diameter.

5. The package of claim 3, wherein said inside diameter has a tolerance within plus or minus 1.2% of said inside diameter.

6. The package of claim 3, wherein said inside diameter has a tolerance within plus or minus 1% of said inside diameter.

7. The package according to claim 1, wherein said closed end is sized and dimensioned so that said container is free standing on said closed end.

8. The package according to claim 1, wherein said thermoplastic substrate comprises a composition selected from the group consisting of polyethylene terephthalate, polystyrene, polypropylene, polyethylene, polyvinyl chloride, nylon, ethyl vinyl alcohol, and mixtures thereof.

9. The package according to claim 1, wherein said overlapping seam at mid-height is thicker than any other portion of said container wall at mid-height.

10. The package according to claim 1, wherein said open end is threaded.

11. The package according to claim 10, wherein said open end is threaded on an outer surface thereof.

12. The package according to claim 10, wherein said open end is threaded on an inner surface thereof.

13. The package according to claim 1, wherein said plug seal closure is operatively engaged with a snap bead, wherein said snap bead is proximal said open end.

14. The package according to claim 1, wherein said neck portion comprises two partially longitudinally extending flashing lines on opposite sides of said neck portion.

15. A package comprising:
    a container having an open end; and
    a plug seal closure operatively engaged with said open end of said container;
    wherein said container comprises;
    a closed end opposing said open end;
    a container wall extending longitudinally between said closed end and said open end about a longitudinal axis;
    an end seam extending at least partially across said closed end; and
    a longitudinal overlapping seam extending from said end seam, a portion of said overlapping seam extending longitudinally along said container wall between said closed end and said open end, wherein said overlapping seam has an overlap magnitude that varies as a function of distance from said closed end and the overlap magnitude is at a minimum proximal said open end;

wherein said open end is narrower than at least a portion of said container away from said open end of said container;

wherein said closed end and said container wall consist of a one-piece thermoplastic substrate; and wherein said open end is a calibrated neck, said calibrated neck has an inside diameter spanning said open end, and said inside diameter has a tolerance within plus or minus 2% of said inside diameter; and wherein said container has a height extending between said open end and said closed end and said container wall has a thickness away from said overlapping seam, wherein at mid-height said overlapping seam along said container wall has an overlap magnitude of more than 1.5 times said thickness of said container wall as measured at a distance from said overlapping seam equal to said overlap magnitude.

16. A method of making the container according to claim 1 comprising the steps of:

a. forming a planar web into a loose conduit having an overlapping portion, said loose conduit positioned about a blowing cane;

b. bonding said overlapping portion of said loose conduit to form an intermediate tube having an intermediate tube open area;

c. advancing said intermediate tube over said blowing cane and a calibration mandrel attached to said blowing cane;

d. closing a blow mold to partially enclose said intermediate tube and conform at least a portion of said intermediate tube to at least a portion of said calibration mandrel to form a calibrated neck having a calibrated neck open area, wherein said calibrated neck open area is less than said intermediate tube open area;

e. blow molding said intermediate tube to form said container wherein at mid-height the overlapping seam along said container wall has said overlap magnitude of more than 1.5 times a thickness of said container wall as measured at a distance from said overlapping seam equal to said overlap magnitude.

17. The package according to claim 15, wherein said neck portion comprises two partially longitudinally extending flashing lines on opposite sides of said neck portion.

* * * * *